Aug. 6, 1929.  F. P. ELLSWORTH  1,723,231
POWER TRANSMISSION FOR MOTOR VEHICLES
Filed March 14, 1927    4 Sheets-Sheet 1

INVENTOR
Francis P. Ellsworth
BY
ATTORNEY.

Aug. 6, 1929.  F. P. ELLSWORTH  1,723,231
POWER TRANSMISSION FOR MOTOR VEHICLES
Filed March 14, 1927  4 Sheets-Sheet 2
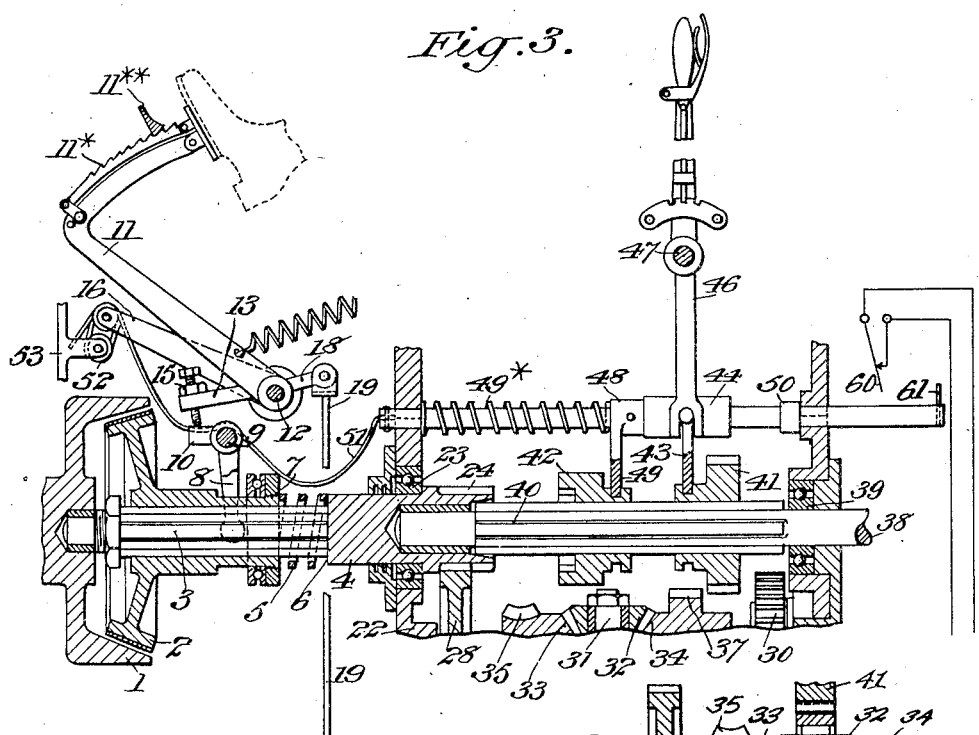
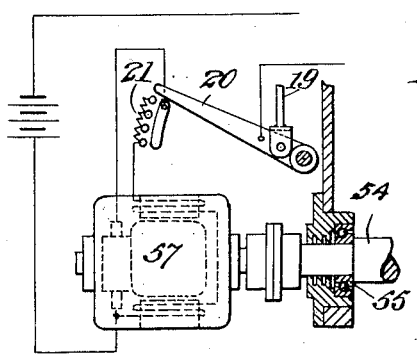
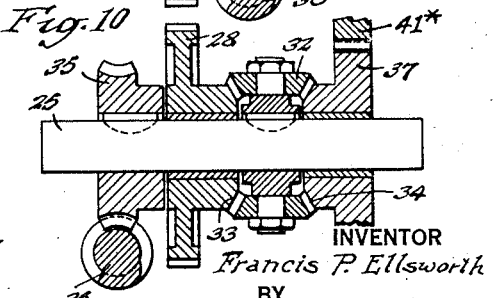
INVENTOR
Francis P. Ellsworth
BY
ATTORNEY.

Aug. 6, 1929.  F. P. ELLSWORTH  1,723,231
POWER TRANSMISSION FOR MOTOR VEHICLES
Filed March 14, 1927   4 Sheets-Sheet 3

INVENTOR
Francis P. Ellsworth
BY
ATTORNEY.

Aug. 6, 1929.  F. P. ELLSWORTH  1,723,231
POWER TRANSMISSION FOR MOTOR VEHICLES
Filed March 14, 1927  4 Sheets-Sheet 4

INVENTOR
Francis P. Ellsworth
BY
ATTORNEY.

Patented Aug. 6, 1929.

1,723,231

UNITED STATES PATENT OFFICE.

FRANCIS P. ELLSWORTH, OF NEW YORK, N. Y.

POWER TRANSMISSION FOR MOTOR VEHICLES.

Application filed March 14, 1927. Serial No. 175,034.

This invention relates to power transmission particularly for motor vehicles, and has for an object to provide an improved transmission mechanism for varying the speed ratio between the source of motive power and the propeller shaft.

Another objects consists in providing such a mechanism in which a differential gear train is arranged to vary the speed through a continuously progressive range, as distinguished from the ordinary interrupted type of three or four speed sliding transmission gears.

Another object consists in providing such a mechanism in which one element of the differential gear train operates as a speed release or escapement, as between the other elements, and whereby the speed ratio between the source of motive power and the propeller shaft is varied gradually.

A further object is to provide such a mechanism in which a single setting of the gears is used for all forward speeds, the necessary changes in speed ratio being effected by controlled motion of an element of the differential gear train, without changing the physical connection between the parts.

A further object is to provide such a mechanism which can be operated to give any desired speed ratio between predetermined high and low limits, and through a continuously progressive range.

A further object is to provide such a mechanism in which the source of motive power may be connected to the propeller shaft directly when the speed ratio between the two has reached a suitable point.

A further object consists in providing certain improvements in the form, construction and arrangement of the several parts, whereby the above named and other objects may be effectively attained.

In motor vehicles as at present constructed, the various gear ratios necessary in the operation of the vehicle are commonly obtained thru the use of sliding gear transmissions which usually contain gears for three forward speeds, the change in ratio being accomplished by disconnecting the driving motor by means of a pedal operated clutch and then operating a hand lever to move the desired gears into or out of engagement. In the performance of these operations, considerable skill and experience is required to prevent a "stripping" or, at least, noisy clashing of the gears, and care must be especially exercised when it is desired to change from a higher to a lower gear. This necessity for close attention to the manner of shifting gears makes the driving of a motor vehicle somewhat difficult to learn, distracts the driver's attention from the road, makes driving in heavy traffic (with its resultant need for frequent shifting of gears) very fatiguing, and causes loss of momentum (during the period of clutch disengagement) and unevenness of motion. This last named defect is especially annoying in the case of large and heavy public service vehicles in which passengers may be standing or moving to or from the door at the very times when gears must ordinarily be shifted.

I am aware that transmission mechanisms have been provided in which intermediate or auxiliary power has been applied to the prime mover as a booster to give the proper proportion of power for the tractive effort under varying loads and to provide an increase in torque at starting. The present conception constitutes a departure from this and other known principles, in that it employs a differential release or escapement which is controlled to permit a full absorption of the motive power and a gradual release thereof to the driven propeller shaft under positive control by the operator.

This novel type of transmission is designed to overcome the above mentioned and other disadvantages, and to make possible the more efficient and reliable operation and maintenance of motor vehicles, and with much less skill, effort and annoyance on the part of drivers, than has heretofore obtained.

A practical embodiment of the invention is shown in the accompanying drawings, in which:

Fig. 3 represents a longitudinal section thru the mechanism, parts being cut away, showing the position of the several elements immediately prior to the gears being put into engagement for driving the vehicle.

Fig. 4 represents, in diagram, the corresponding position of the motor control element shown in Fig. 2.

Fig. 9 represents an arrangement of the differential gearing in which the controlled additional intermediate element of the differential gear train is the driven element from the forms shown in Figs. 1 and 5, in which it is the driving element.

Fig. 10 represents an arrangement of the differential gearing in which the intermediate element is the controlled element, as distinguished from those forms in which it is the driving element or the driven element.

Figure 1:
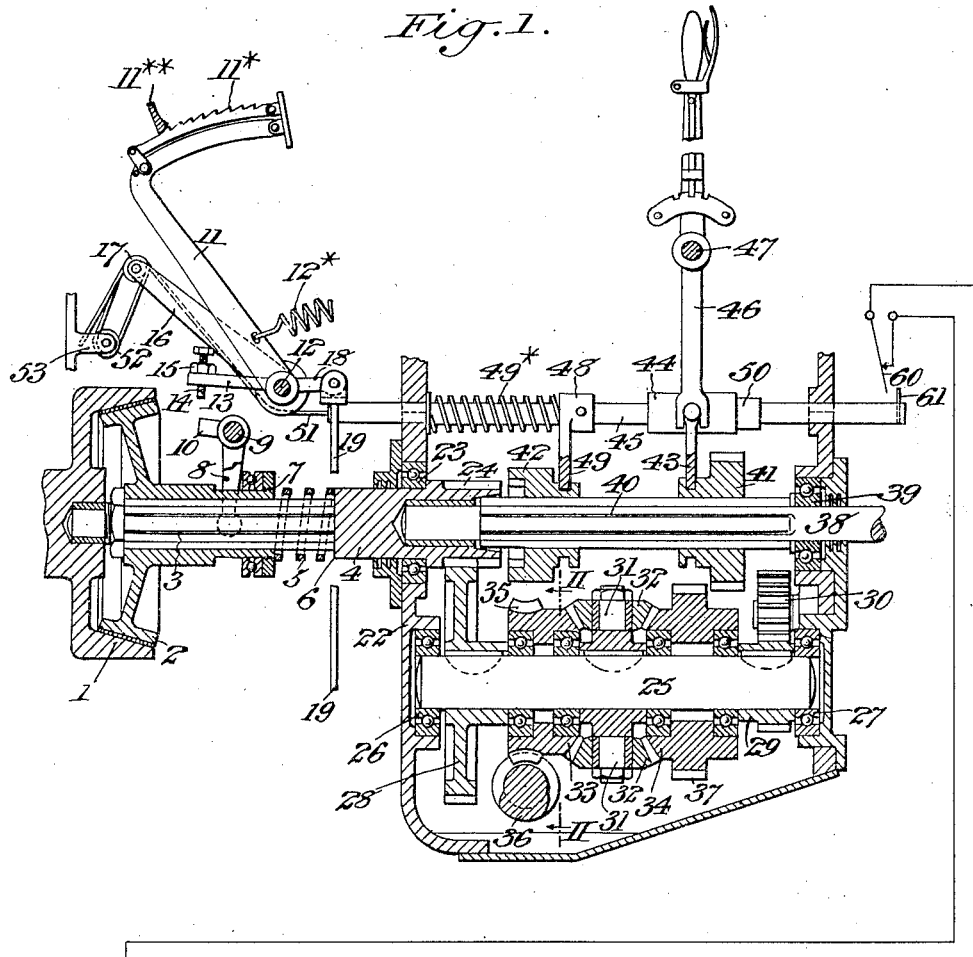
Fig. 1 represents a longitudinal section thru the mechanism, parts being shown diagrammatically, the gears being shown in their neutral or disengaged position.

Referring to the drawings, 1 is the outer member of a cone clutch attached in any usual manner to the source of motive power, not shown, 2 is the inner clutch member, slidably engaged upon the splined end 3 of a clutch shaft 4 and normally pressed into engagement with the outer member by the spring 5 bearing against the shoulder 6 on the shaft 4 and the collar 7 on the extended hub of the inner member 2. A fork 8, pivotally mounted upon a support 9 and provided with an arm 10, is arranged to bear against the collar 7 and compress the spring 5 so as to disengage the clutch members 1 and 2, when the arm 10 is depressed.

A clutch pedal 11, pivotally mounted upon a support 12, is provided with an arm 13 in the end of which is a set screw 14 bearing a lock nut 15; this screw is adapted to contact with and depress the arm 10 in order to disengage the clutch as above described. The clutch pedal is further provided with an arm 16 at the end of which is a pulley or the like 17, the purpose of which will be later discussed, and with a short arm 18 to which is attached a connecting rod 19. The other end of the rod 19 is secured to the movable contact member 20 of a rheostat, indicated generally at 21, (Fig. 2), and the operation of which will be hereinafter described.

A housing for the transmission gearing is shown at 22. The clutch shaft 4 passes into this housing 22 thru the bearing 23 and has its inner end provided with a spur gear 24.

A counter-shaft 25 is carried by the bearings 26, 27 in the ends of the housing 22; to this shaft is keyed a spur gear 28 in permanent engagement with the clutch shaft gear 24. Adjacent the opposite end of the counter-shaft 25 is keyed a spur gear 29 in permanent engagement with the reverse idler gear 30.

Figure 5:
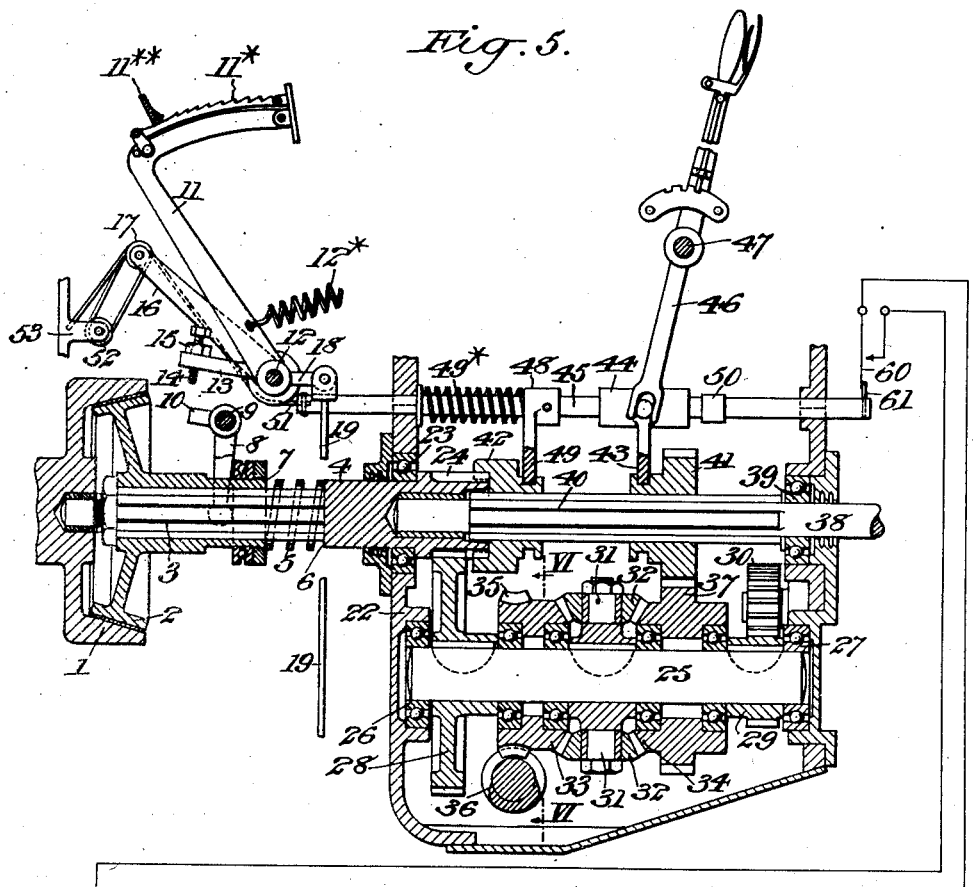
Fig. 5 represents a longitudinal section thru the mechanism, parts being shown diagrammatically, with the direct drive clutch members engaged for driving the vehicle forward.

Intermediate the gears 28 and 29 is mounted the novel differential transmission mechanism included in this invention. As shown in Figs. 1 and 5, this mechanism comprises a cross arm 31 keyed to the counter-shaft 25 and carrying bevel gears 32, 32 which are in engagement with the bevel gears 33 and 34. The bevel gear 33 is formed on an annulus which is made freely rotatable around the counter-shaft 25; this annulus is provided additionally with a worm gear 25 which engages with a worm 36. The bevel gear 34 is also formed on an annulus which is freely rotatable around the counter-shaft 25; this annulus is provided additionally with a spur gear 37.

The sliding gear or driven shaft 38 (to which the propeller shaft, not shown herein, is attached) enters the housing 22 thru the bearing 39 and is provided with a splined portion 40 on which both a spur gear 41 and a clutch member 42 are slidably interlocked. The gear 41 is adapted to be slid into engagement with the gear 37 as shown in Fig. 5, for forward driving, or into the disengaged position shown in Fig. 1 for leaving the vehicle at rest, or into engagement with the reverse idler gear 30, for reversing the vehicle. The clutch member 42 is provided with internal teeth and is adapted to be slid into or out of engagement with the spur gear 24 on the inner end of the clutch shaft 4 so as to provide a direct driving connection between the shaft 4 and the sliding gear shaft 38.

The position of the sliding spur gear 41 is controlled thru a fork 43 attached to a sleeve 44 which is slidably mounted on an endwise movable shaft 45. A hand lever 46 of conventional form is shown pivotally mounted on a support 47, and is adapted to be moved to and secured in the neutral and forward positions shown respectively, in Figs. 1 and 5, and the reverse position, not shown, as may readily be understood. Pinned to the shaft 45 is a collar 48 having a fork 49 arranged to control the position of the sliding clutch member 42. Between the collar 48 and the front wall of the housing 22 is placed a coil spring 49* which tends normally to hold the clutch member 42 out of engagement with the spur gear 24. The shaft 45 is also provided with an abutment 50, so placed that when the sleeve 44 is slid back so as to disengage the gear 41 from the gear 37, said sleeve will engage against said abutment and slide the shaft 45 back far enough to disengage the clutch member 42 from the spur gear 24, as clearly appears in Fig. 1. To the forward end of the shaft 45 is attached a flexible connection 51 which passes around the support 12 of the clutch pedal 11, over the pulley 17, around a pulley or the like 52 mounted in the bracket 53, again around pulley 17 and back to the bracket 53 where it is made fast. The clutch pedal 11 is held up in its position as shown in Fig. 5 by a spring 12* or the like, and it may be stated that this clutch pedal spring is of sufficient strength to overcome the depressing effect communicated to the clutch pedal thru the connection 51 from the spring 49, and to hold the pedal normally in its upraised position. A pedal released rack 11* coacts with an abutment 11** to hold the pedal in any of its positions, as the operator may desire.

The arrangement of the flexible connection 51 and its associated pulleys is such that a quick release of the shaft 45 results upon a slight depression of the clutch pedal 11, in order to permit prompt disengagement of the direct drive clutch member 42 from the gear 24. It will be understood that an equivalent effect might advantageously, in some instances, be obtained by other means, and the invention in this particular is not to be deemed limited to the arrangement shown. The connection 51 hangs slack when the pedal 11 is depressed to or near its full extent.

Figure 2:
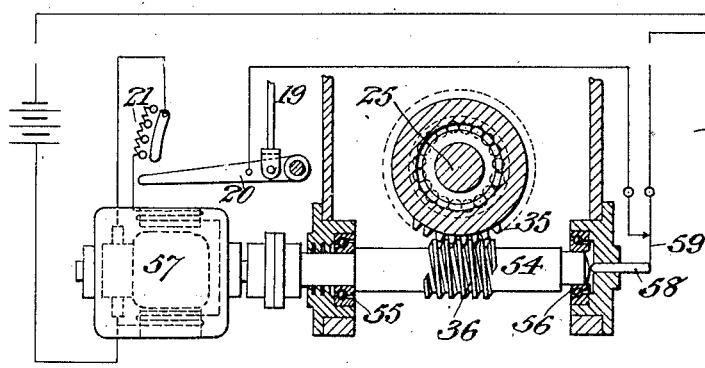
Fig. 2 represents a transverse section thru part of the differential gearing at the line II—II of Fig. 1; parts being shown diagrammatically.
Figure 6:
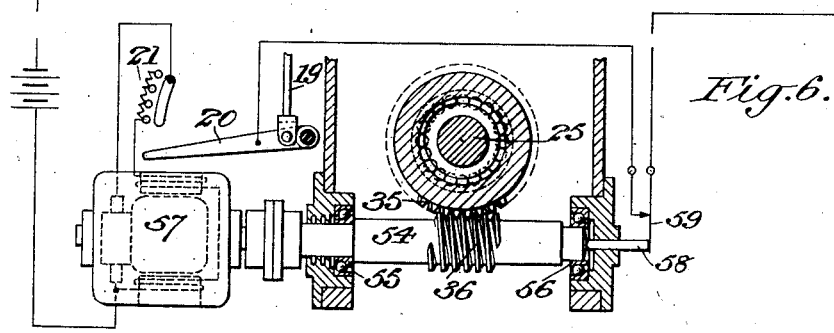
Fig. 6 represents a transverse section thru part of the differential gearing at the line VI—VI of Fig. 5; parts being shown diagrammatically.

Referring particularly to Figs. 2 and 6, it will be seen that the worm 36 is carried on a cross shaft 54 mounted in thrust bearings 55 and 56. An electric motor for turning the shaft 54 and its worm 36 is indicated generally at 57 and it is controlled by the rheostat 21. The shaft 54 is permitted to have a slight longitudinal motion between the bearings 55 and 56, and a plunger 58 is arranged at the end opposite the motor 57, so that when the shaft 54 moves toward or against the bearing 56, the plunger is pushed out so as to break the motor circuit by displacing the spring contact member 59. It will be understood that when the shaft 54 bears against the thrust bearing 55, as shown in Figs. 2 and 6, the plunger 58 is held in the position shown by means of the spring contact member 59 (or equivalent means), and the motor circuit is then closed. Another point at which the motor circuit may be broken is indicated at 60; a projection 61 is provided near the rear end of the movable shaft 45 and this is arranged to break the circuit at 60 when the shaft 45 is moved far enough forward to permit the clutch member 42 to engage the spur gear 24, as shown in Fig. 5. At all other times, as in Figs. 1 and 3, the projection 61 is away from the spring contact and the circuit at 60 is closed.

In explaining the operation of the mechanism just described, the action of the novel arrangement of differential gearing will be first discussed, since it is in this feature that the present invention departs most fundamentally from the sliding gear transmissions heretofore known.

Assume that the counter-shaft 25 is being driven at a certain speed. Then the cross arm 31, being keyed to the counter-shaft, is also rotating at the same speed and is revolving the bevel gears 32, 32 around its axis at the same speed. Suppose then that the worm 36 is turned so as to permit the annulus bearing the worm gear 35 and the bevel gear 33 to rotate at a speed double that of the counter-shaft and in the same direction; it is then evident that the bevel gears 32, 32 will rotate around the cross arm 31 and will run around the bevel gear 34 as if on a track, without communicating any motion thereto—the whole rotative motion of the counter-shaft and the cross arm being "absorbed" by the double speed rotation of the bevel gear 33. If then the speed of the worm 36, and hence the bevel gear 33, is reduced, the latter will no longer absorb all the speed of the cross arm, but will permit a release or escapement of such speed, and the bevel gears 32, 32 will communicate some of their motion to the bevel gear 34 on the annulus bearing spur gear 37. When the speed of the bevel gear 33 has been reduced to a speed equal to that of the counter-shaft and cross arm, the bevel gear 34 will be rotating at a like speed and the bevel gears 32, 32 will be revolving around the counter-shaft but will not be rotating around the cross arm at all. As the speed of the bevel gear 33 is still further reduced, the bevel gears 32, 32 will start rotating in an opposite direction and the bevel gear 34 will rotate faster and faster, until, when the rotation of the bevel gear 33 has been stopped entirely, it is then turning at twice the speed of the counter-shaft and cross arm—the bevel gears 32, 32 then running around bevel gear 33 as on a track while it stays motionless. The amount of motion absorbed by the differential gear depends solely upon the speed of the electric motor, and not upon the amount of power transmitted or the power of the electric motor, the worm gearing 35, 36 being irreversible or self-locking, so that the function of the electric motor is that of a release or escapement to unlock the differential gear at any desired speed. A pitch of about 5° is shown as fulfilling the requirements of an irreversible worm gearing in the present embodiment, but this may be varied in other instances in accordance with well understood engineering practice.

The operation of a vehicle equipped with this novel differential transmission mechanism may now be set forth.

Let it be assumed that the vehicle is at rest with the mechanism in its neutral position, shown in Fig. 1. The vehicle motor is started, thereby turning the clutch shaft 4, causing its gear 24 to drive the gear 28 which in turn rotates the counter-shaft 25 and the cross arm 31 with its differential bevel gears 32, 32. The worm 36 is motionless and so, therefore, is the bevel gear 33; the bevel gears 32, 32 run around on the bevel gear 33 as on a track and the bevel gear 34 is rotated at a speed twice that of the counter-shaft and cross arm, as above described. Since the spur gear 37 is not in engagement with the sliding spur gear 41, the former simply runs free and no further motion is communicated to anything (except the reverse idler gear 30 which runs whenever the counter-shaft is running). The operator then depresses the clutch pedal 11 to its full extent, as shown in Fig. 3; this disengages the inner cone clutch member 2 from the outer cone clutch member 1 and moves the contact member 20 of the rheostat across the contacts to its upper "off" position (Fig. 4) so that all the transmission mechanism may come to rest. When this has occurred, the lever 46 is moved into its forward position, as seen in Fig. 5, thereby placing the sliding gear 41 in engagement with the gear 37. As the operator allows the pedal 11 to return to its upraised position, the first effect will be to swing the contact member onto the contacts of the rheostat and start the motor 57 at its full speed, which is arranged to be such that it will absorb all of the motion given the bevel gears 32, 32 by their revolution around the counter-shaft 25, as hereinabove described. At substantially the same time the inner cone clutch member 2 is permitted to engage the outer cone clutch member 1, so that the drive from the vehicle motor is communicated to the counter-shaft and the cross arm keyed thereto; this motion is absorbed by reason of the bevel gear 33 being permitted by the electric motor driven worm 36 to rotate, so that the bevel gear 34 receives no moving force. As the pedal 11 continues to rise its only effect is to pass the contact member 20 slowly across the rheostat 21 so as to decrease the speed of the motor 57; this slows down the speed of the bevel gear 33 and starts the release or escapement of movement to the bevel gear 34, sliding spur gear 41 and sliding gear shaft 38, as will be clear from what has been said above. When the contact member 20 has passed to its lower "off" position (Fig. 2) the motor 57 stops and the bevel gear 33 ceases its rotation, and the full escapement of movement to the gears 34 and 41 and the shaft 38 is permitted. The gearing shown herewith is so proportioned that at this point the shaft 38 is running at the same speed as the clutch shaft 4, and a direct drive connection may be made, with the differential gearing running substantially idly. This is accomplished by letting up the pedal 11, permitting the direct drive clutch member 42 to engage with the spur gear 24 as clearly appears in Fig. 5. The drive is then direct from the vehicle motor to the sliding gear shaft and thereby the vehicle propeller shaft (not shown), and will remain so during ordinary forward driving of the machine.

When it is desired to disengage the direct drive clutch member 42 from the gear 24 in order to utilize a lower gear ratio, the clutch pedal 11 is depressed slightly, say 4° as shown in Fig. 1. This allows the cord 51 to become slack and the spring 49 will tend to force the member 42 back out of engagement with the gear 24; since the friction driving connection between these two will ordinarily hold them in engagement even against the tension of the spring 49, the operator momentarily closes the throttle of the vehicle motor, causing the gear 24 to slow up with relation to the momentum of the clutch gear 42, and momentarily releasing the friction connection between them, when the spring will immediately disengage the direct drive members. From this point the drive will again be entirely thru the differential gearing and any desired gear ratio may be obtained by suitably depressing the clutch pedal which controls the position of the contact member 20 on the rheostat 21, as may be readily understood.

It sometimes happens that a vehicle will tend to run or coast faster than its motor is driving it and at such a time the shaft 38 will become, relatively, the source of power which will be transmitted thru the differential gear train to the worm gear 35. The motor 57 is not of sufficient strength to drive the worm 36 and worm gear 35 against the force thus communicated from the drive shaft, so in order to prevent injury to the motor, the means hereinabove described are provided for breaking the motor circuit by displacement of the spring contact member 59. This occurs immediately when there is any resistance to the motion of the worm gear 35 such that the shaft 54 is forced toward or against the bearing 56—thereby pushing out the plunger 58. It may be remarked that this action is important chiefly when the direct drive clutch elements are out of engagement, since, as heretofore explained, the engagement of these elements is always accompanied by a breaking of the motor circuit at 60, and breaking it also at 59 would obviously have no additional effect. It is thus apparent that when the vehicle motor is used as a brake (for instance, in descending a long hill), it is always in its "high speed" connection with the sliding gear shaft 38, whether or not the direct drive elements 42 and 24 are in engagement.

It may be noted that while the motor 57 actually drives the shaft 54 and worm 36 thereon, the latter does not "drive" the worm gear 35 but rather merely allows or permits it to rotate at varying speeds in the direction in which it is being urged by the drive of the vehicle motor, as transmitted by the counter-shaft, cross arm 31 and bevel gears 32, 32. It is for this reason that the shaft 54 is normally pressed against the bearing 55, which would not be the case if the worm gear 35 had actually to be "driven" by the worm 36.

Figures 7, 8:
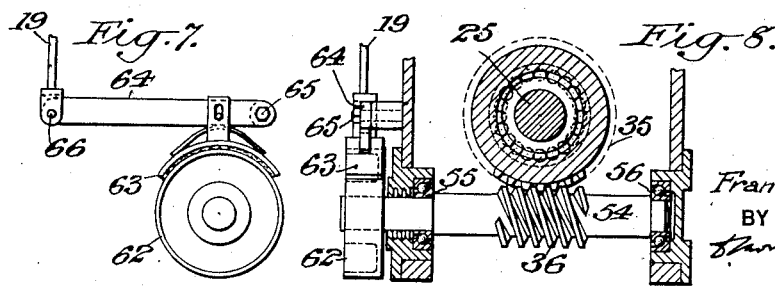
Figs. 7 and 8 represent in elevation and transverse section respectively, an alternative form of differential controlling means.

An alternative means for controlling the motion of the worm gear 35 is shown in Figs. 7 and 8. In this form the worm gearing is given such a pitch as will enable it to drive the worm 36 at all speeds and control is secured by the provision of a brake drum 62 and shoe 63. The bar 64 to which the shoe is attached is pivoted at 65 and attached at 66 to the rod 19, so that when the clutch pedal 11 is depressed the shoe 63 is lifted from the drum 62 and the worm 36 is free to rotate at any speed necessary to enable the speed of the bevel gears 32, 32 to be absorbed. As the clutch pedal is gradually released, the brake takes hold and slows down the worm 36 until it stops entirely, with the releasing or escapement effects on the differential gearing exactly like those resulting from a slowing down of the motor in the form first described. When the brake is used all wiring is, of course, dispensed with and the shaft 54 need be permitted no longitudinal motion between its bearings 55 and 56.

It is obvious that other specific forms of brake may be used in the alternative arrangement just described and the use in this connection of electrical, mechanical or other brakes of any suitable type is intended to be covered, since it is clear that the differential gearing will in all such cases still operate upon the same new principle as hereinabove disclosed.

In the embodiment of the invention illustrated in Figs. 1 to 6 the intermediate element of the differential gear train is the driving element, and results in a speed ratio between the driving and driven elements, under full release of speed, of 1 to 2. Other modifications consist in differential gear trains in which the intermediate element is the driven element; and in which it is the controlled release or escapement element, examples of these modifications being illustrated in Figs. 9 and 10.

In the form shown in Fig. 9 the gear 34 is keyed to the shaft 25 and is the driving gear, the intermediate gear 32 is the driven gear, and the gear 33 is the controlled speed release or escapement element, and results in a speed ratio between the driving and driven elements, under full release of speed, of 2 to 1.

In the form shown in Fig. 10 the driving gear 28 is loose on the shaft 25, the gear 34 is the driven gear, and is also loose on the shaft 25, and the intermediate gear 32 is the controlled speed release or escapement element, being keyed to the shaft 25, and to which shaft the worm gear 35 is also keyed, and results in a speed ratio between the driving and driven elements, under full release of speed, of 1 to 1, the driven element being driven reversely to the driving element. The gear 41* in this case is an idler gear.

Figure 11:
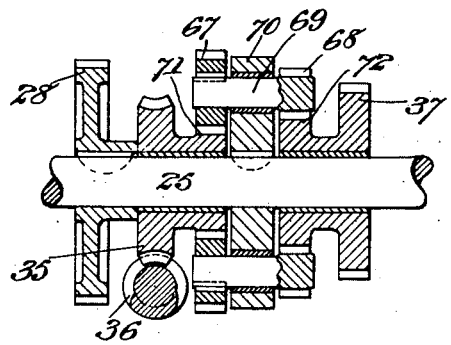
Figs. 11, 12 and 13 represent alternative arrangments of the differential gearing, designed to be substantially interchangeable with the arrangement shown in Figs. 1 and 5, and to embody the same principle to secure the same result.
Figure 12:
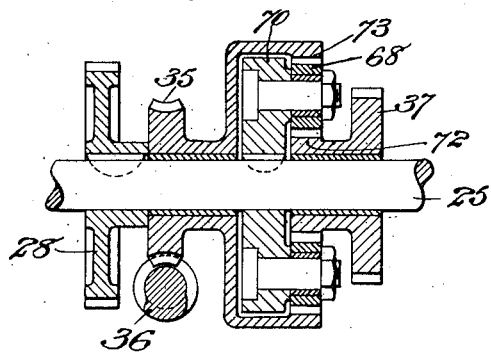
Figure 13:
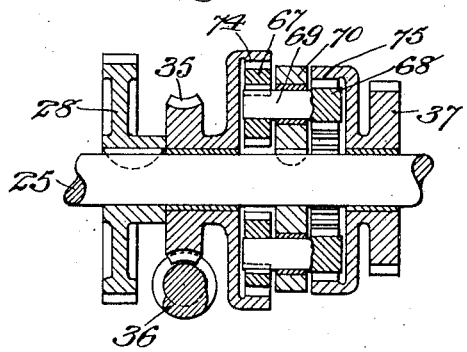

It is obvious that the specific arrangement of bevel differential gears shown in Figs. 1, 3 and 5, and in Figs. 9 and 10, may be replaced by other arrangements embodying the same principle, and Figs. 11, 12 and 13 show some of the variations to which this part is susceptible.

Fig. 11 shows the bevel gears 32, 32 replaced by spur gears 67 and 68 which are keyed to a shaft 69 mounted in the element 70 which is keyed to the counter-shaft 25. The bevel gears 33 and 34 are here replaced by spur gears 71 and 72 with which the gears 67 and 68 are meshed. The motion of the gear 71 is controlled by means of a worm gear 35 and worm 36 as before, while the gear 72 is attached to a gear 37, also as before.

Fig. 12 differs from Fig. 11 in that it shows the gears 67 and 71 of Fig. 11 as replaced by an internal gear 73 which meshes directly with the small spur gear 68.

Fig. 13 is a variant of Fig. 11 in that it shows the spur gears 71 and 72 as replaced by internal gears 74 and 75.

In the form shown in Figs. 11, 12 and 13 the particular arrangement is similar to that shown in Figs. 1 to 6, that is, the intermediate element is the driving element, but obviously the arrangement may be changed to incorporate the arrangements shown in Figs. 9 and 10 in which the intermediate element is respectively the driven and the controlled speed release or escapement element.

It is to be understood that the term "vehicles" as used herein is intended to include those for use on land, in the water and in the air, in so far as transmissions embodying this invention may proove suitable therefor.

It is evident that various changes may be resorted to in the construction, form and arrangement of the several parts without departing from the spirit and scope of my invention; hence, I do not intend to be limited to the particular embodiments herein shown and described.

What I claim is:

1. In a motor vehicle, the combination of a transmission mechanism, including a differential gear train having a driving element and a driven element, and control means for varying the speed ratio between said driving and driven elements, a motor for driving said driving element, a clutch for connecting and disconnecting said motor to said driving element, manually operable means adapted to operate said clutch, and means operatively associated with said manually operable means adapted to operate said control means.

2. In a motor vehicle, the combination of a transmission mechanism, including a differential gear train having a driving element and a driven element, and control means for varying the speed ratio between said driving and driven elements, a motor for driving said driving element, a clutch for connecting and disconnecting said motor to said driving element, manually operable means adapted to operate said control means, and means operatively associated with said manually operable means adapted at a predetermined point in the operation of said manually operable means to operate said clutch.

3. A transmission mechanism of the character described, including a differential gear train having a driving element and a driven element, and a differential element for varying the speed ratio between said driving and driven elements, a worm gear associated with one of said elements, an electric motor driven worm in engagement therewith and having axial thrust, and switch means connected in the motor circuit and operable by the axial thrust of said worm adapted to make and break the motor circuit.

4. A transmission mechanism of the character described, including a differential gear train having a driving element and a driven element, and a differential element for varying the speed ratio between said driving and driven elements, an electric motor and a rheostat in the motor circuit, a worm gear associated with one of said elements, a worm in engagement therewith driven by said motor and having axial thrust, manually operable means adapted to operate said rheostat, switch means connected in the motor circuit and operatively associated with said manually operable means adapted at a predetermined point in the operation of said manually operable switch means to break the motor circuit, and means connected in the motor circuit and operable by the axial thrust of said worm adapted to make and break the motor circuit.

5. In a motor driven shaft vehicle, the combination of a motor, a drive shaft, a differential gear train between said motor driven shaft and said drive shaft adapted to drive the latter at varying speeds and at a corresponding speed to said motor driven shaft, control means for said differential gear train, and clutch means between said motor and said drive shaft, a clutch, operatively associated with said control means and adapted to be operated thereby to provide a direct driving connection between said motor driven shaft and said drive shaft when the differential gear train has operated to bring the speed ratio of the two substantially to unity.

6. A transmission mechanism of the character described, including a driving shaft, a driven shaft, a differential gear train in power-transmitting connection between said driving and driven shafts, and having a total maximum gear ratio of one, a permanent driving connection between said driving shaft, a clutch and said differential gear train and clutch means adapted to be operated to provide a direct driving connection between said driving and driven shafts when the total gear ratio of said differential gear train has reached substantially its maximum.

7. A transmission mechanism of the character described, including a prime mover, a drive shaft, a differential gear train between said prime mover and said drive shaft including a differential element adapted to vary the speed of said drive shaft with respect to said prime mover, said differential gear train adapted to drive said drive shaft in unity with said prime mover when said differential element is inoperative, clutch means between said prime mover and said drive shaft adapted to be operated to provide a direct driving connection between them when the differential gear train has operated to bring the speed ratio of the two substantially to unity, and means operated by said clutch means for rendering said differential element inoperative when said clutch means is connected for insuring the maintenance of this ratio thru the differential gear train whenever said clutch means is providing such direct connection and means adapted to effect operation of said differential element.

8. A transmission mechanism of the character described, including a prime mover, a drive shaft, a differential gear train between said prime mover and said drive shaft having a driving element and a driven element, and control means for varying the speed ratio between said driving and driven elements including a differential element adapted to vary the speed of said drive shaft with respect to said prime mover, said differential gear train adapted to drive said drive shaft in unity with said prime mover when said differential element is inoperative, clutch means between said prime mover and said drive shaft adapted to be operated to provide a direct driving connection between them when the differential gear train has operated to bring the speed ratio of the two substantially to unity, manually operable means adapted to effect operation of said control means, and means operatively associated with said manually operable means adapted at a predetermined point in the operation of said manually operable means to operate said clutch means.

9. A transmission mechanism of the character described, including a prime mover, a drive shaft, a differential gear train between said prime mover and said drive shaft having a driving element and a driven element, and control means for varying the speed ratio between said driving and driven elements, including a differential element adapted to vary the speed of said drive shaft with respect to said prime mover, said differential gear train adapted to drive said drive shaft in unity with said prime mover when said differential element is inoperative, clutch means between said prime mover and said drive shaft adapted to be operated to provide a driving connection between them when the differential gear train has operated to bring the speed ratio of the two substantially to unity, and having a frictional resistance moment against axial movement, manually operable means for disengaging said clutch means, and secondary disengaging means normally inoperative against said resistance moment adapted to automatically disengage said clutch member upon a release of said resistance moment.

10. In a motor vehicle, the combination of a transmission mechanism, including a differential gear train having a driving element, a driven element, and an independently movable element for varying the speed ratio between said driving and driven elements, braking means for controlling the independent movement of said last mentioned element, a motor for driving said driving element, a clutch for connecting and disconnecting said motor to said driving element, manually operable means adapted to operate said clutch, and means operatively associated with said manually operable means, adapted to operate said braking means.

11. A transmission mechanism of the character described, including a differential gear train having a driving element, a driven element, and an independently movable element for varying the speed ratio between said driving and driven elements, braking means for controlling the independent movement of said last mentioned element, driving means for driving said driving element, a clutch for rendering said driving means operative and inoperative, manually operable means adapted to operate said braking means, and means operatively associated with said manually operable means adapted at a predetermined point in the operation of said manually operable means to operate said clutch.

12. In a transmission mechanism of the character described, a clutch shaft, a drive shaft coaxial with said clutch shaft, and a counter-shaft, a differential gear train carried by said counter-shaft, adapted to be driven by said clutch shaft and including a driving element and a driven element, and an independently controllable element for absorbing the speed of said driving element and releasing it to the driven element to vary the speed ratio between said driving and driven elements, means carried by said drive shaft adapted to be operatively connected and disconnected with respect to said driven element and clutch means adapted to directly connect and disconnect said clutch shaft and said drive shaft.

Signed at New York, county of New York, and State of New York, this 10th day of March, 1927.

FRANCIS P. ELLSWORTH.